United States Patent
Hinnrichs

[11] Patent Number: 5,867,264
[45] Date of Patent: Feb. 2, 1999

[54] APPARATUS FOR IMAGE MULTISPECTRAL SENSING EMPLOYING ADDRESSABLE SPATIAL MASK

[75] Inventor: Michele Hinnrichs, Solvang, Calif.

[73] Assignee: Pacific Advanced Technology, Santa Ynez, Calif.

[21] Appl. No.: 950,928
[22] Filed: Oct. 15, 1997
[51] Int. Cl.$^6$ ...................................................... G01J 3/02
[52] U.S. Cl. .......................................... 356/310; 356/330
[58] Field of Search .................................... 356/310, 326, 356/328, 330

[56] References Cited

U.S. PATENT DOCUMENTS 5,479,258 12/1995 Hinnrichs et al. ...................... 356/326

Primary Examiner—F. L. Evans
Attorney, Agent, or Firm—Michael G. Petit

[57] ABSTRACT

An apparatus for spectral detection of remote objects. The apparatus consists of an input optic which focuses the field of view onto an image receiving surface consisting of an addressable spatial mask. The mask sequentially projects portions of the scene onto a diffractive optical element which focuses onto a photodetector array. The first image receiving surface of mask is partitioned into independently addressable and controllable subsurfaces, or gates, adapted to receive an electronic control signal from a programmable control signal generator. Each gate in the receiving mask directs a portion of the image incident thereon to a diffractive lens in response to a control signal communicated thereto. This gated image is dispersed by the diffractive lens and focused upon the photosensitive surface of a photodetector array. The photodetector array is partitioned into pixels having a number in ratio to the gates in the addressable mask. The signal output of a pixel within the optical path of the dispersed gated light is sampled and stored in a signal processor. A control signal generator sequentially or randomly addresses each gate in the mask causing the gate to direct that portion of the image thereon to the diffractive lens. The output signal from each pixel on the photodetector array corresponding to the addressed gate in the mask is sampled and stored until the entire image is recorded. This process is repeated as the diffractive optic is scanned through the spectral range of interest. The mask provides enhanced spectral and spatial resolution of the scene.

8 Claims, 8 Drawing Sheets

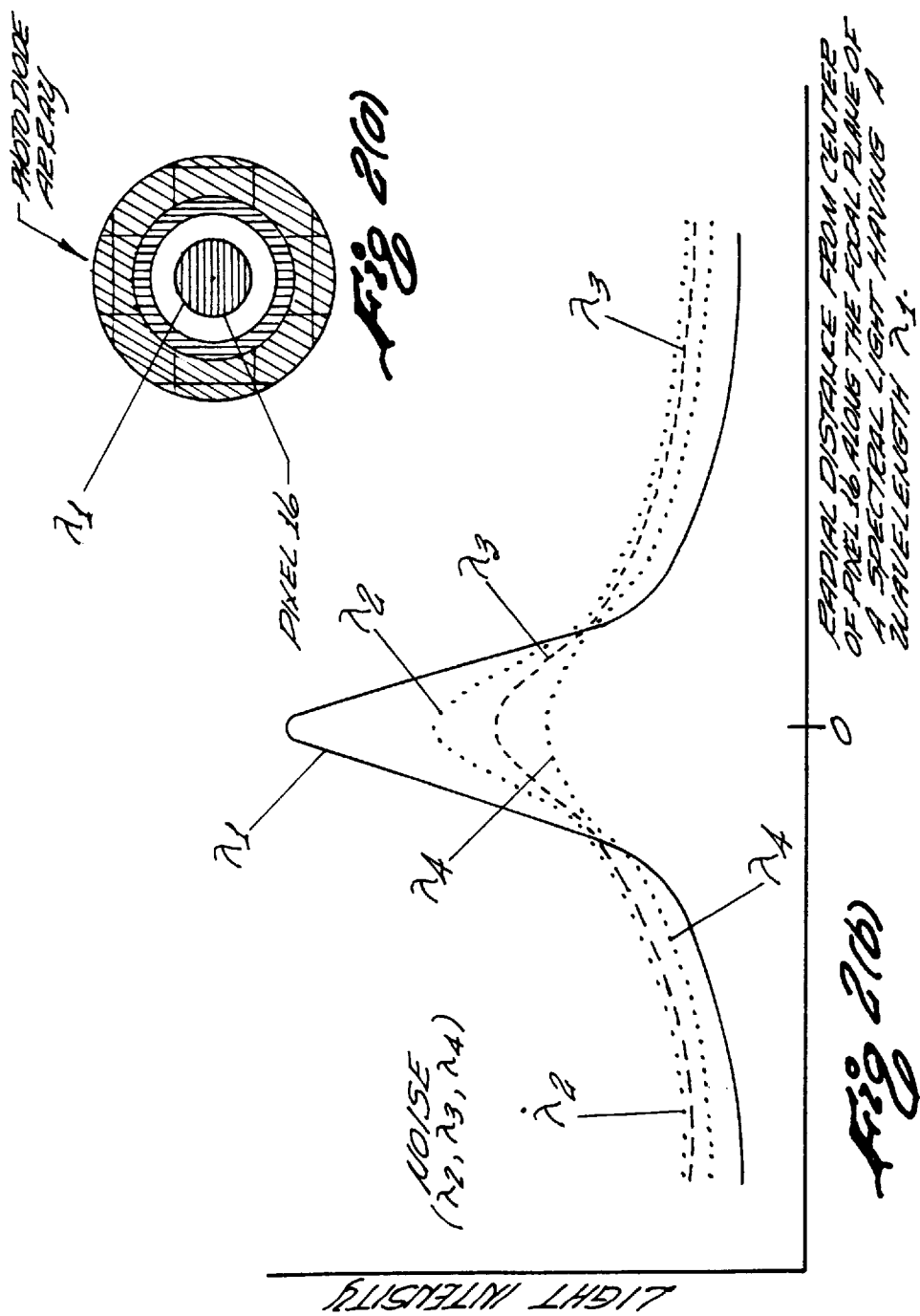

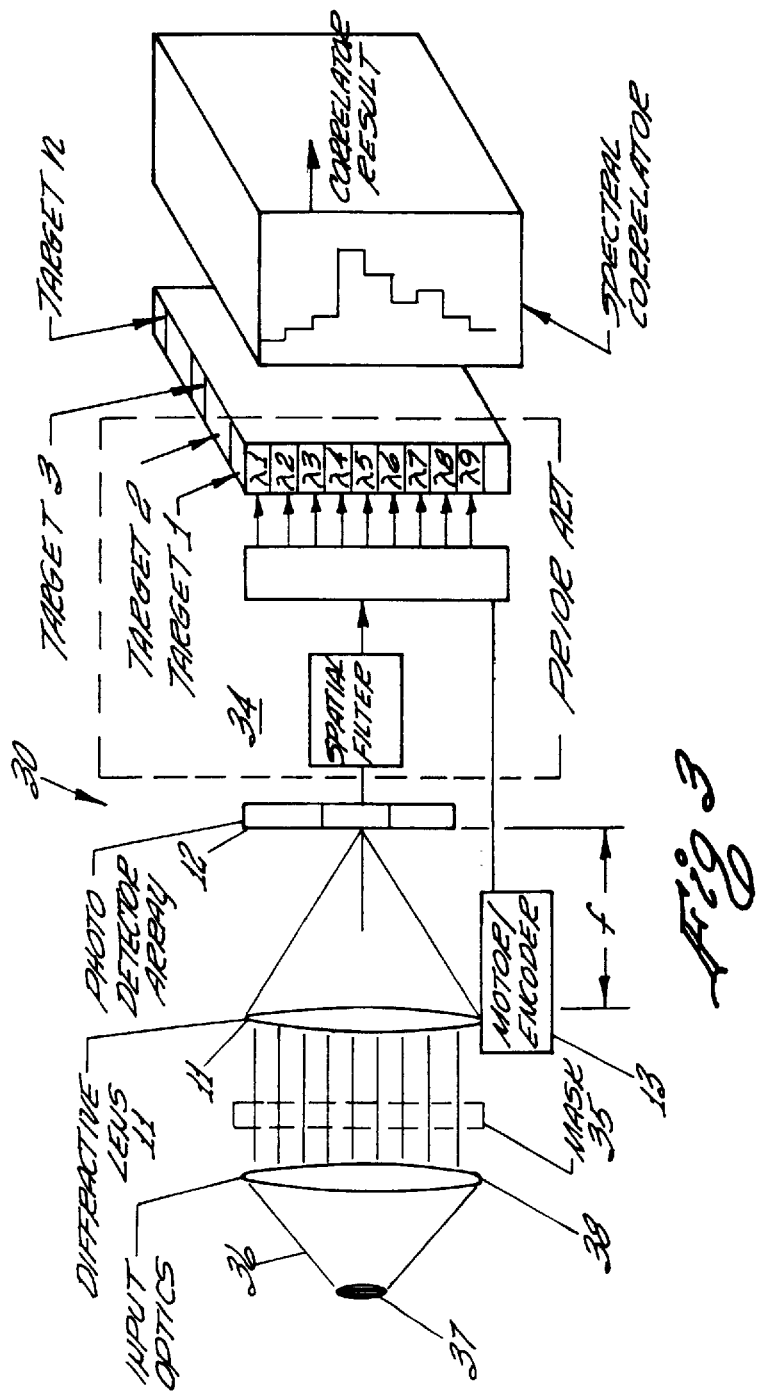

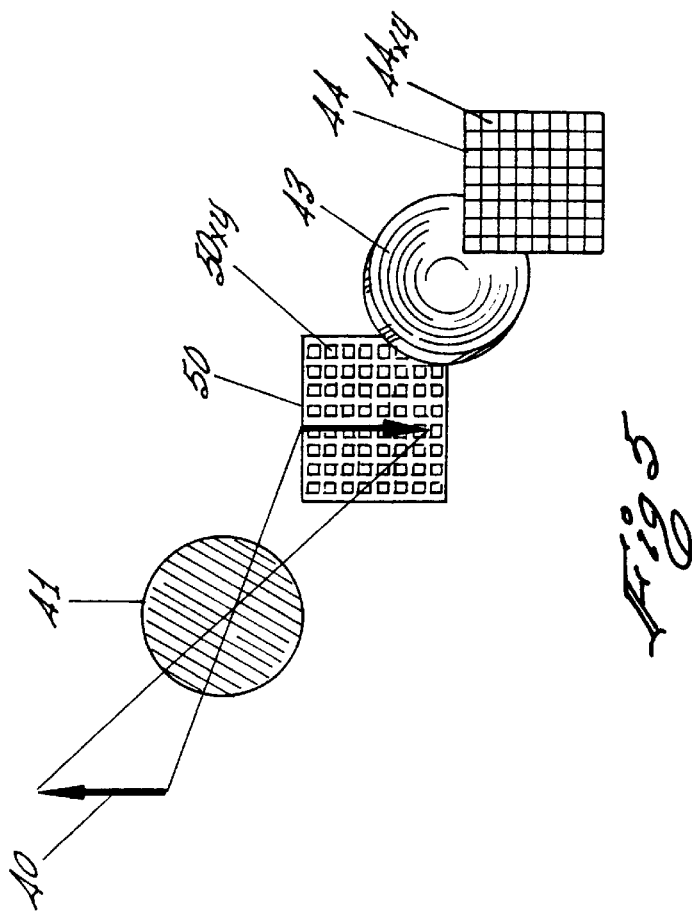
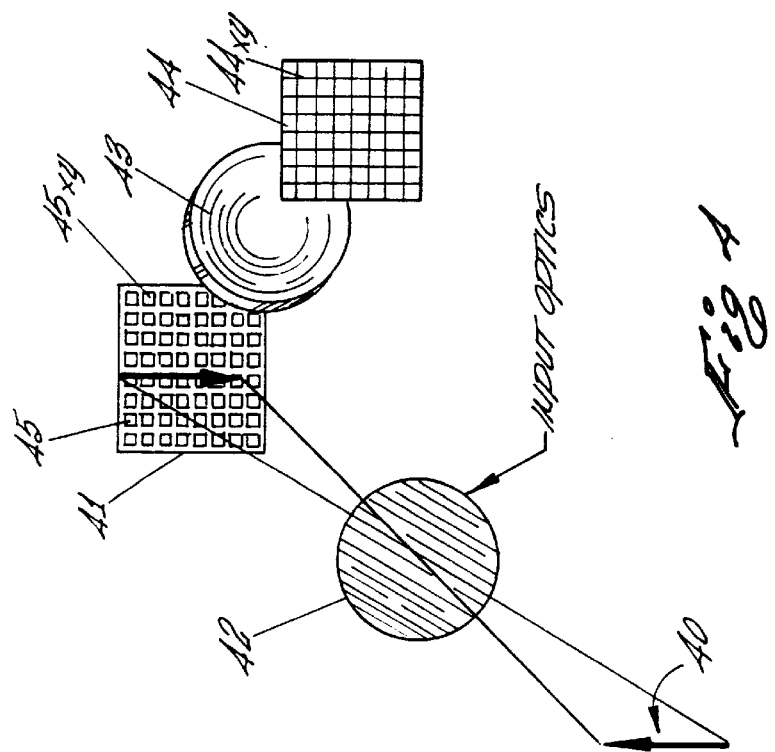

APPARATUS FOR IMAGE MULTISPECTRAL SENSING EMPLOYING ADDRESSABLE SPATIAL MASK

BACKGROUND OF THE INVENTION

1. Field of the Invention

This invention is an imaging spectrometer useful for measuring the spectral composition of objects from a remote location, and more particularly, for measuring the spectral composition objects within a field of view of the imaging system.

2. Prior Art

Spectrophotometers (color meters) are widely used in the area of target recognition. The principle underlying the use of spectrophotometers in target recognition is that different targets reflect, emit or absorb light differently. Alternatively, different targets represent independent light sources, the light emanating from each target having an observable spectra which is an identifiable inherent characteristic that target which may be used for target identification.

Baird, in U.S. Pat. No. 3,343,448 describes a spectroscopic apparatus useful for analyzing the emission spectrum of an object positioned along the optical axis of a reflecting zone plate. The Baird apparatus utilizes reflective optical elements, the source or target must lie between the reflecting mirror and the reflecting zone plate. Such an optical construction is not operable for analyzing the spectrum of light emanating from a remote object or target such as an incoming ballistic missile or a group of such targets within a field of interest.

Image multispectral sensing (IMSS) records the spectrum of individual luminous objects (targets) within an image or scene. IMSS is capable of simultaneously recording the spectrum of light emerging from many different discrete light sources contained within a single field of view. U.S. Pat. No. 5,479,258 to Hinnrichs et al., the contents of which is incorporated herein by reference thereto, discloses an image multispectral sensing device, which provides good spectral resolution for images comprising luminous point objects which have good contrast ratios with respect to the background. The device employs a dispersive optical element to: (a) disperse light emanating from each luminous target positioned within the field of view of the device input optic; and (b) focus the dispersed light onto a photosensitive surface of a photodetector. The photosensitive surface comprises a plurality of addressable photosensitive elements or pixels coextensive therewith. The output signal from each pixel provides a measure of the intensity of light incident upon the pixel as a function of the wavelength. The spectral range of the image is scanned by sequentially changing the focal plane of the system by incrementally repositioning the diffractive lens relative to the photosensitive surface along the optical axis. If a source of light in the field of view is polychromatic, chromatically defocused spectral components of dispersed light for the source are superimposed on the in-focus spectral component producing unwanted spectral noise convolved with the true signal. For images comprising discrete widely separated point light sources, the spectral noise convolution in the pixel's output signal is deterministic with a change in focal length and is easily removed by a deconvolution process of the output in a signal processor.

The principles underlying IMSS are illustrated FIGS. 1 and 2. In the IMSS apparatus of FIG. 1, light 100 emanating from a target 10 comprising an image is dispersed by means of a diffractive lens 11 having an aperture DA and an optical axis. The diffractive lens 11 focuses the dispersed spectral components of light 100 on a n×n array of pixels disposed on a planar surface of a photodetector 12 positioned at the focal plane of a dispersed spectral component. At long ranges the target 10 appears as an unresolved point which subtends a single pixel 16 on the photodetector 12. At shorter ranges, the target 10 resolves and covers multiple pixels. The diffractive lens 11, disposed between the target 10 and the photodetector 12 disperses the light 100 emanating from the target and focuses the spectral components $\lambda_3$, and $\lambda_4$ on focal planes $f_r$ and $f_b$ respectively. The spectral focal point of a diffractive lens depends on the wavelength of the spectral component. Only spectral components of light within a narrow spectral band will be in sharp focus on the focal plane occupied by the photodetector.

With reference to FIG. 2, the spectral component of dispersed polychromatic light having wavelength $\lambda_1$ is sharply focused on the pixel 16 of the photosensitive surface 12 when the surface lies in the focal plane for $\lambda_1$, while all other wavelengths ($\lambda_2$, $\lambda_3$, and $\lambda_4$) are unfocused and diffuse, forming a multiple pixel blur centered on pixel 16 with a smooth intensity distributed therearound as shown in FIG. 2(b). By moving and repositioning the diffractive lens 11 and/or the photodetector 12 at a different focal length, a spectral component having a different wavelength $\lambda_2$ will be in sharp focus on the pixel 16 of the photosensitive surface 12 of the photodetector. By incrementally changing the diffractive lens/photodetector spacing f to reposition the focal plane and recording each pixel's output at the focal plane, a sequence of monochromatic representations of the image is recorded. Each monochromatic image is represented by a frame and contains the signal output of each pixel on the photodetector at a particular focal length. The frames can be viewed as a digital color separation of the image and that superimposing the frames will reconstruct the fully chromatic image.

Returning to FIG. 1, two spectral bands, $\lambda_1$ (red) represented by the solid line, and $\lambda_2$, (blue) represented by the dotted line, are used for illustrative purposes. The photodetector 12 has a photosensitive surface consisting of discrete photosensitive elements or pixels 16 disposed in a layer on a supporting surface 12 with a pixel dimension x. The orientation of the photosensitive surface is orthogonal to the optical axis and centered on the optical axis of the diffractive lens. The clear aperture diameter of the diffractive lens 11 is DA and is shown near the far left of the figure. The distance from the diffractive lens at which the planar photosensitive surface of the photodetector intersects the optical axis is adjustable and determines the focal length f of the IMSS system. When the photodetector 12 intersects the optic axis at a distance $f_r$ from the diffractive lens, the apparatus is tuned for red light, and the focal length for blue light is $f_b$. By the apparatus being "tuned" to a particular wavelength of light it is meant that the photosensitive surface of the photodetector lies in a plane orthogonal to the optical axis of the diffractive lens and the photosensitive surface is the focal plane of the tuned wavelength of dispersed light. Thus, $\Delta = f_b - f_r$, is the difference in focal length between the red and blue spectral components.

The diffraction limited blurred diameter $d_0$ is the diameter of a circle on the focal plane $f_r$ circumscribing the red light in focus at half peak intensity. It is important for the spectral deconvolution algorithm employed by the signal processor in IMSS, that $d_0$ be small relative to the diameter of one pixel. When the photodetector 12 is repositioned on the optical axis at the focal length for the blue light $f_b$, the blurred diameter of the red light becomes $d_n$, which is much larger than the diameter of one pixel. At this point, the blue light is in sharp focus on the photodetector and the diffraction limited blurred diameter of the blue light in focus at the detector surface approaches $d_0$ and is small relative to the diameter of one pixel. A portion of the output signal from a pixel having an intense monochromatic spot focused thereon will be due to blurred, diffuse out-of-focus spectral components of light from other independent light sources within the image and represents noise.

If the distance between the diffractive lens 11 and the photodetector 12 is changed, different wavelengths of light from each target comprising the image sequentially come into and out of focus on the photodetector 12, generating a sequence of photodetector signal outputs corresponding to sequential monochromatic representations or filtered "snap-shots" of the image over a range of wavelengths. The output signals from each of the individual pixels in the photodetector 12 corresponding to a particular focal plane are stored as a "frame" in a signal processor 14. A "frame" is a data set comprising the output signals produced by each pixel in the photodetector corresponding to a particular focal length. The blurred unfocused spectral components of a point source will contribute to the signal output of the pixel in the optical path thereof as discussed above, and the contribution is easily subtracted out by deconvolution algorithms such as spatial filters to provide substantially only the pixel output signal corresponding to the focused spectral component within a frame.

The signal processor 14 uses a deconvolution algorithm to enhance the in-focus image of each "frame" of data. By tracking and comparing the signal output of the individual pixels in each frame from one frame to the next, the relative position and spectral composition or "color signature" of each luminous object comprising the image is recorded. For example, an image comprising a single monochromatic representation is shown in FIG. 6 where the vertical bars represent the intensity of the output signal of a pixel xy at a particular focal length. Only the in-focus image remains in a frame after passage through the deconvolution algorithm of the signal processor 14 as shown in FIG. 7. The pixel output signal remaining within a frame after deconvolution represents light received from a target in the image corresponding to the spectral color relative to the focal length. The spectral correlator 15 receives the spectral intensity data from the signal processor and compares the spectral signature of each of the independent light sources (targets) comprising the image with the signatures of previously identified targets stored within the comparators memory for purposes of identification. The spectral signature of the individual targets comprising an image or the deployment of targets within an image may also be stored for reference.

A fundamental property of diffractive lenses (such as a Fresnel lens), which serves as the basis for IMSS, is that the focal length of a diffractive lens varies inversely with the illumination wavelength, i.e. $f(\lambda)=\lambda_0 f/\lambda$. A diffractive lens is more dispersive than any known glass lens and the dispersion has the opposite sign. Thus, if an image detector surface defining a focal plane is positioned to intersect the optical axis at a distance $f(\lambda_1)$ from the diffractive lens, luminous objects within the image having a spectral component with a wavelength $\lambda_1$ will be in sharp focus, whereas objects imaged only by light at other wavelengths will be significantly defocused. The defocused wavelength components emanating, being blurred and distributed over a plurality of adjacent pixels can be subtracted out using image processing techniques described earlier. If the image detector is repositioned to intersect the optical axis at a distance $f(\lambda_2)$ from the diffractive lens, luminous objects with a spectral component having a wavelength $\lambda_2$ will be in sharp focus thereon. Hence, by incrementally changing the distance between the diffractive lens and the photodetector to span $\Delta$, one can determine the spectral composition of light emanating from each object comprising the field of view.

FIGS. 2(a) and 2(b) illustrate the affect of unfocused spectral components upon the spectral resolution of a focused spectral component of target-derived light using IMSS. In FIG. 2(a), $\lambda_1$ is in focus such that light within a narrow band centered on the spectral component having wavelength $\lambda_1$ illuminates a portion of the photodetector 12 centered on pixel 16. In FIG. 2(b) the light intensity at the photodetector is plotted as a function of distance perpendicular to the center of the pixel on the photodetector array for several different wavelengths $\lambda_1$, to $\lambda_4$. The distance from "o" wherein each spectral component reaches half the maximum intensity is the radius of the corresponding circle in FIG. 2(a). Even though the primary wavelength $\lambda_1$ is in sharp focus and centered on pixel 16, unfocused, dispersed spectral components having wavelength $\lambda_2$, $\lambda_3$ and $\lambda_4$ also illuminate and contribute to the output signal of the pixel 16.

If the image includes more than one light source, dispersed out-of-focus spectral components of light emanating from other luminous targets comprising the image will also contribute to the signal output of pixel 16. While the symmetry of the out-of-focus components $\lambda_2$, $\lambda_3$ and $\lambda_4$ of light from a discrete point source of light are symmetrically distributed around pixel 16, the distribution of dispersed spectral components of light from other nearby targets in the image illuminating pixel 16 and adjacent pixels may be asymmetric and non-uniform and difficult to deconvolve by the signal processing algorithm and thus limits spectral resolution. In the example of FIG. 2, the dispersed spectral components $\lambda_1$, $\lambda_2$, $\lambda_3$ and $\lambda_4$ are from a single point source of light and are blurred concentrically around the pixel at $\lambda_1$. Such a symmetric source of noise may be removed by deconvolution algorithms in a computer, such deconvolution is more difficult for noise arising from optical mixing of multiple light sources in an image. It is desirable to provide a IMSS device accomplishing the foregoing image spectral analysis as is required for target characterization and identification and which includes means for enhancing spectral resolution by reducing the unfocused light incident upon the detector array.

SUMMARY OF THE INVENTION

It is an object of this invention to provide a imaging spectrometer apparatus for measuring the spectral composition of infrared, visible or ultraviolet light emanating from one or more remote sources of light comprising a distant field of view.

It is yet another object of this invention to provide a imaging spectrometer apparatus which can determine the spectral composition of light emanating from different portions of a large unitary luminous object comprising a remote field of view.

It is another object of this invention to provide a imaging spectrometer apparatus useful for comparing the spectral composition of light (color signature) emanating from a remote luminous object within a field of view with the color signature of previously identified luminous objects.

It is a particular object of the invention to provide a IMSS apparatus operable for performing the above objects and which provides the spectral resolution attainable for the spectral analysis of light sources within an image with finer spectral resolution by eliminating the spectral/spatial crosstalk from objects in the field of view.

These and other aspects of the invention will soon become apparent in view of the drawings and description of the preferred embodiments.

BRIEF DESCRIPTION OF THE DRAWINGS

FIGS. 2(a) and 2(b) show the intensity distribution of dispersed spectral components of light from a single point source illuminating a photosensitive surface and show the relative intensity of the in-focus spectral component having a wavelength $\lambda_1$ with respect to the superimposed intensity of out-of-focus spectral components of the dispersed light at the focal plane of $\lambda_1$ and generally illustrating the relationship between spectral resolution in of the in-focus image and the out-of-focus background.

FIG. 3 is a schematic diagram of an IMSS spectrophotometer showing the optical relationship of the addressable transmissive spatial mask (35) with respect to the input optics for controlling transmission of the image projected thereon to the diffractive lens (11) for dispersion and to the photodetector (12) for spectral detection.

FIG. 4 is a plan view of a portion of the IMSS spectrophotometer of FIG. 3 wherein the image-receiving surface of the reflective addressable spatial mask is partitioned into optically reflective, individually controllable subsurfaces, each reflective subsurface forming a gate operable for directing light incident thereon (gated light) to be dispersed by the diffractive lens in response to a control signal thereby permitting only the dispersed spectral components from a gate-sized portion of the image to reach the photodetector.

FIG. 5 is a plan view of an optical portion of an image multispectral sensing device as in FIG. 4 wherein the gates comprising the image-receiving surface of the mask are independently controllable shutters or apertures which selectively transmit the discrete portion of the image projected thereon by the input optics to the diffractive lens in response to a control signal.

DESCRIPTION OF THE PREFERRED EMBODIMENT

Figure 1:
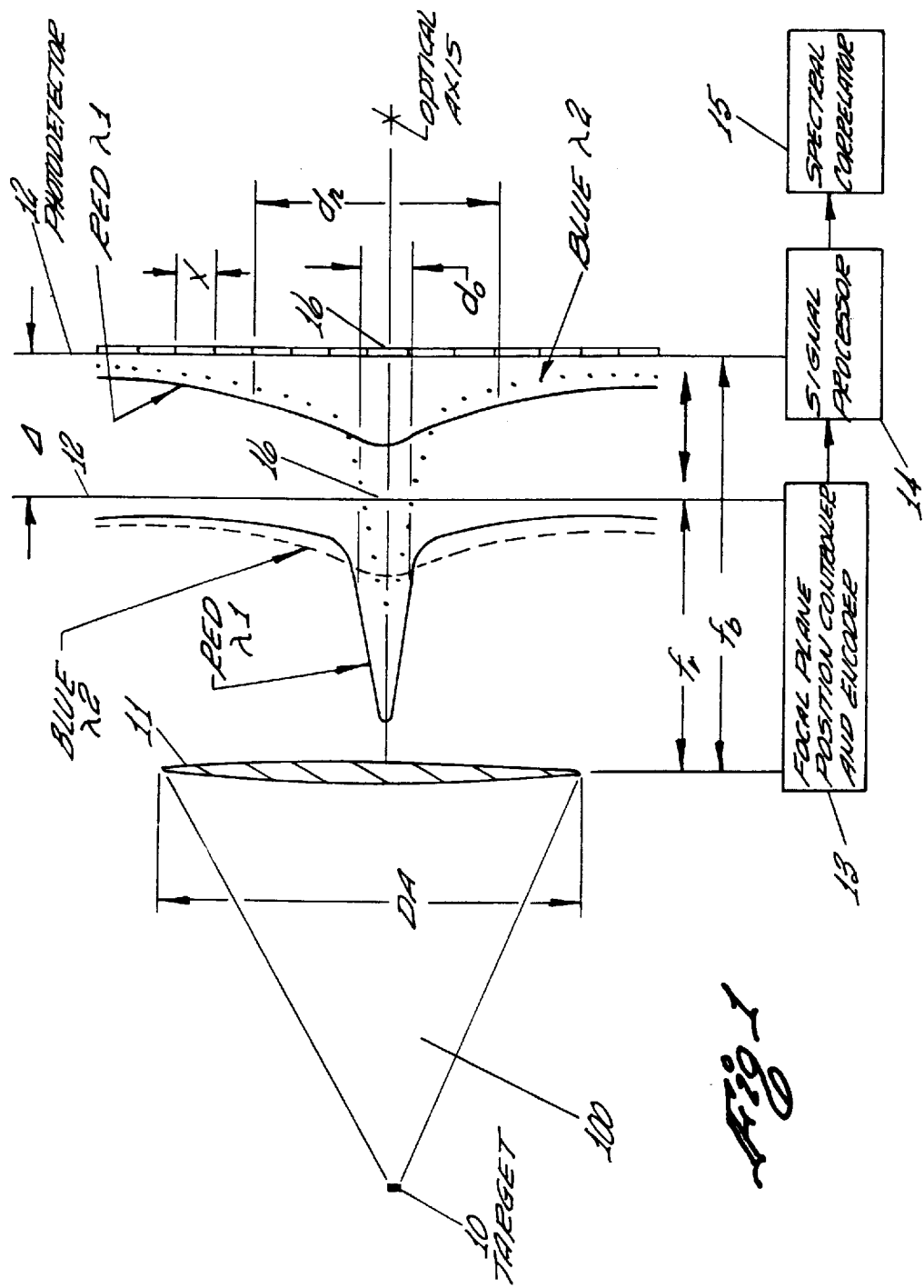
FIG. 1 is a schematic diagram showing red and blue spectral components of dispersed polychromatic light emerging from a diffractive lens in sharp focus at different focal planes along the optic axis.

The spectral resolution of IMSS can be thought of as the ratio of the amount of in-band radiation to the amount of out-of-band radiation falling on a pixel. An analytic derivation of the spectral resolution can be found in diffraction theory, (see, for example, E. Wolf, Proc. Roy. Soc. (A) 204,542(1975)). When a diffractive lens 11 (in FIG. 1) is employed as a dispersive element, the spectral resolution $\Delta\lambda$ is a function of the incident wavelength $\lambda_1$, the focal length $f_0$ of the diffractive lens, the pixel size and the f-number f/# of the diffractive lens and may be represented by the following equation:

$$\Delta\lambda = \frac{\text{pixel size } f/\#_1\lambda_1}{f_0} \quad \frac{u}{v} \tag{1}$$

where u and v are unitless parametric values relative to a position parallel and perpendicular to the optical axis respectively.

Equation 1 shows that when IMSS is employed to resolve spectral components of a source of light and the photodetector array lies in the focal plane of the diffractive lens the spectral resolution $\Delta\lambda$ is directly proportional to the pixel size of the detector array and inversely proportional to the focal length of the diffractive lens. The finest spectral resolution can be achieved by employing small pixel sizes in the photodetector and a diffractive lens having a long focal length. If a field of view comprises more than one independent light source or a large luminous object having a non-uniform spectral composition, the spectral resolution is adversely effected by the superposition of unfocused spectral components from other sources within the image.

The present invention provides a IMSS apparatus incorporating an addressable spacial mask which permits the spectral composition of a single pixel to be determined with the spectral resolution set forth in Equation 1 even when the image comprises more than one independent source of light. A prior art IMSS system is shown in FIG. 3. The apparatus 30 comprises a diffractive lens 11 having an optical axis, a photodetector 12 having a planar photosensitive surface orthogonal to the optical axis and intersecting the optical axis at a distance f from the diffractive lens, a stepping motor with a position encoder 33 adapted to change f in response to a control signal, a programmable signal processor 34 which includes programmable computer means adapted to provide a control signal to the stepping motor 33 for changing f and provide control signals to the gates and identify and synchronously record the output signal of the pixel in optical communication with the gate. The signal processor is adapted to receive and organize the output signals from each pixel within the photodetector into a sequence of frames, each frame in the sequence containing the signal output of each pixel at a focal plane f corresponding to an input of the position encoder 33 identifying a focal plane, process the frames to spectrally filter the spectral data and present the processed spectral data to a spectral correlator 35 for comparison, identification, storage, or for future reference purposes. Light 36 emanating from a remote target 37 within a field of view is collimated by input optics 38 which directs the light 36 comprising an image of the field of view to impinge upon a diffractive lens 31. The light 36 is focused by the diffractive lens 11 onto the photodetector 12. The distance f between the photodetector array 12 and the diffractive lens 11 is controlled by mounting one of the components 11 or 12 on translating means 33 such as a stepper motor, a piezoelectric translation device or other such translating device capable of varying f to traverse the range of focal lengths encompassing the spectral components of the light 36. The distance f, which is the instantaneous distance between the diffractive lens 11 and the photodetector 12 along the optic axis, is determined by a stepping motor 33 which is controlled by the signal processor 34. The signal processor records the signal output of each pixel (not shown in FIG. 3) in the photodetector 32. Thus, for every value of f, only luminous objects comprising the image having a spectral component is in sharp focus at the plane of the photodetector 12 will be recorded within the frame corresponding to the focal plane for the spectral component. If the image includes multiple light sources or targets, the intensity of the spectral component of light emanating from targets 1 through n in the image are recorded within a frame for each value of f as shown. The record of the signal output of each pixel within the photodetector corresponding to a particular focal distance (wavelength $\lambda$) comprises a single frame. In FIG. 3, only a single target 37 is shown. The relative intensity and wavelength of the spectral components $\lambda_1$–$\lambda_9$ of the light 36 emanating from the target 37, may be compared with spectral data stored within the memory of a spectral correlator 35. The correlator 35 provides a means for storing and comparing spectral data.

Figure 8:
FIG. 8 illustrates the variation of the output signal from a single pixel corresponding to the intensity of each spectral component of source light as the focal plane is sequentially repositioned.

As stated earlier, the signal output of each pixel within the photodetector array 12 is electronically scanned into a signal processor 34. The signal processor compares the signal output of each pixel with the signal output of pixels immediately adjacent thereto. If the signal output of the adjacent pixels is uniformly lower than the output of the pixel being processed, the uniform output signal may be attributed to noise and subtracted from the measured signal output of the pixel to provide a measure of the intensity of the in-focus spectral component. The process is repeated for each pixel having a signal output greater than a threshold value and the electronically filtered spectral intensity data is stored in a frame. The procedure is repeated at incremental focal planes until frames encompassing the spectral range of interest are recorded. For example, with reference to FIG. 1, when the photodetector 12 is at the position of $f_r$, only the red spectral component will be in focus at pixel 16 and remain in the frame corresponding to $f_r$ after signal processing at the position $f_b$, only the blue spectral component will pass through the signal processing filter and appear as the only signal output in the frame corresponding to $f_b$. An example of the variation in a single pixel's measured signal output in sequential focal planes 1–24 is shown in FIG. 8. The vertical axis corresponds to the intensity of light incident on the pixel. The variation in pixel signal output due to a change in the focal length along with point and edge spatial filtering for each focal length by signal processing means provides spectral content data for all targets in the field of view comprising the image.

The change in distance between the diffractive lens and the photodetector required for IMSS must be sufficient to span the range of focal lengths for the spectral components of interest in the target-derived light. For example, a piezoelectric driven movable element may be used to mount the diffractive lens. Focal length scans of 160 millimeters per second are practical with this approach. A stepper motor or a pneumatic/hydraulic translational device can also be employed for changing the distance f between the diffractive element and the photodetector when either of the components are moved thereby thereon.

The defocused spectral components of light comprising the spectra of nearby independent sources of light within the image will also impose noise upon a pixel's output signal. If the out-of-focus spectral component from an adjacent target is very intense, it can dramatically and asymmetrically effect the signal output of the pixel receiving the in-focus spectral component of the less luminous light source. The present invention employs an addressable spatial mask, shown in phantom at 35 in FIG. 3, disposed between the input optics 38 and the diffractive lens 11 to shadow one of a plurality of adjacent light sources in an image to reduce interspectral noise at the photodetector. The mask has an image receiving surface which consists of a planar array of discrete, addressable, independently controllable optical gates disposed to receive an image projected thereon by the input optics. The function of the mask is to select only a pixel-sized portion of the image incident thereon and sequentially direct the gated pixel-sized portion of the image to be dispersed by the diffractive lens. The diffractive lens focuses the spectral components to illuminate the photodetector. Light from other portions of the image are blocked out while the signal output of the pixel receiving the gated light is synchronously recorded. Each of the plurality of switchable gates forming the image-receiving surface of the mask are sequentially "switched" in response to a control signal from the signal processor and will direct only the portion of the image incident thereon to the diffractive lens in synchronization with the electronic readout of the pixel upon which the gated light is focused. In this manner each spectral component comprising the image is sequentially mapped onto the photodetector surface a "gate-full" at a time in synchronization with the sequential output sampling of the gate-sized pixel in the photodetector upon which the gated light is focused. Out-of-focus light from other spatially separated portions of the image is blocked out. For example, if the image captured by the IMSS input optics and projected onto the mask is an aerial view of Santa Barbara, Calif., and the portion of the image on a gate is one city block, the mask presents the color image of Santa Barbara to the photodetector a city block at a time. Thus, a candle flame in an otherwise dark city block may be spectrally resolved even when an adjacent city block has intense, broad-spectrum stadium lights on.

FIG. 4 is a plan view of a portion of a prior art IMSS apparatus modified to provide light spectral resolution within an image comprises more than one independent source of light, in accordance with the present invention. The addressable spatial mask 41 has a substantially continuous reflective image-receiving surface partitioned into a plurality of discrete gates 45. Each gate is an independently switchable, having an area preferably equal to the optical pixel-sized footprint at the reflective surface. The reflective spatial mask 41 is disposed within a IMSS apparatus to receive light comprising an image 40' at the object 40 from the outward-looking input optics 42 and, upon receipt of a control signal from a signal processor 34 (FIG. 3), reflect a portion of the light comprising the image 40' to impinge upon diffractive lens 43. A deformable mirror device, DMD, may be used as the reflective mask 41, adapted to selectively reflect and redirect only the portion of the image 40' incident upon a gate 45xy to be dispersed by the diffractive lens 43, the diffractive lens directing the dispersed light to illuminate a pixel of the photodetector 44xy in synchronization with the electronic sampling of the output signal of the pixel receiving the gated portion of the image. The reflective surface of gate 45xy of the mask 41 is deformed by application of a control signal, upon deformation, the gate will electronically reflect the portion of light comprising the image 40' incident thereon (gated light) to the diffractive lens 43. The diffractive lens focuses the dispersed spectral components of the gated light upon pixel 44xy. The signal output of pixel 44xy is synchronously sampled and stored within in the signal processor. The reflective surface of all gates other than 45xy in the DMD mask 41 are oriented such that the remaining, major portion of the image 40' incident thereon is reflected at an angle to the optical axis of the diffractive lens. The reflective surface of each micro mirror 45xy is preferably uniform in reflective surface area and has the same surface dimensions on the mask as the pixel footprint.

FIG. 5 is similar to the embodiment of the IMSS apparatus of FIG. 4. A transmissive addressable spacial mask 50 is disposed between the input optics 41 and diffractive lens 43. The mask 50 provides a surface disposed to receive an image of a field of view from the input optics. The surface is partitioned into an array of gates consisting of a plurality of switchable, pixel-sized apertures, each aperture operable for selectively transmitting the portion of the light comprising the image 40' and incident thereon to the diffractive lens 43. The dispersed spectral components of the gated portion of light exit the diffractive lens and illuminate the pixels distributed on the surface of the photodetector 44. Out-of-focus light from other portions of the image do not produce noise on the photodetector 44 because the other portions of the image are blocked out during the measurement of the gated light.

Figure 9:
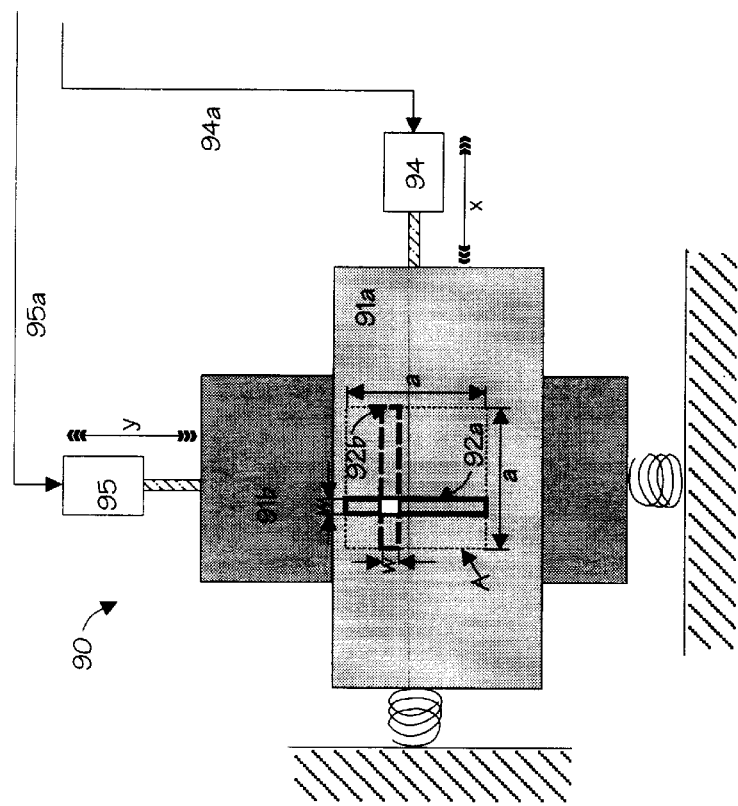
FIG. 9 is a plan diagram illustrating a transmissive addressable mask employing juxtaposed orthogonal slots in a pair of movable opaque sheets to form an addressable, repositionable gate in an image plane.
Figure 11:
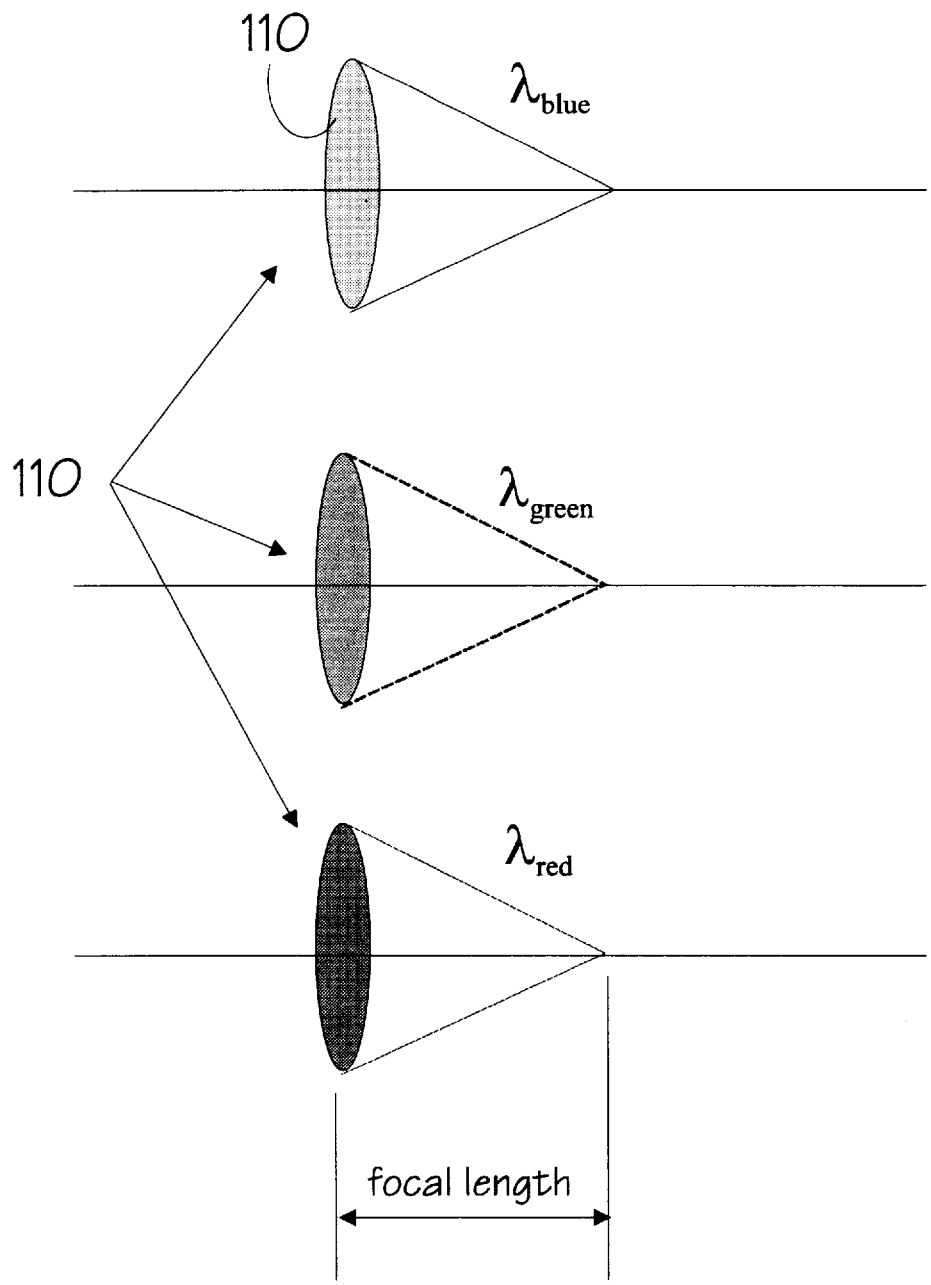
FIG. 11 is a schematic diagram illustrating a diffractive optical element wherein the chromatic focal length of the diffractive element can be varied by applying an electrical signal across the element.

A hypothetical example of a transmissive mask 90 is shown in FIG. 9 and illustrates the gating principle of a spatially addressable transmissive mask for image sampling. Two opaque elongate sheets, 91a and 91b, have respective identical rectangular slots 92a (only partially visible) and 92b therein. Sheet 91a is disposed to slideably overlie sheet 92b and rotated 90 degrees with respect thereto so that the slots 92a and 92b are perpendicular to one another and intersect to form a gate 93. If either sheet is moved a distance A with respect to the other sheet in a direction perpendicular to the length a of the slot, a rectangular aperture is sequentially scanned at the successive regions of slot overlap. By incremental repositioning of each sheet in a direction perpendicular to the slot length in the moving slot, an image receiving surface is the size of the window. Thus, length a of each slot 92a and 92b provides an image receiving surface having an area $A=a^2$. The number of gates within $A^2$ or the "gate packing density" is determined by the width W of the slots which, for the exemplary purpose of illustration, will be equal to the width of a pixel on a photodetector, and the surface area of a transmissive gate, $W^2$ will be equal to the surface area of the pixel footprint at the mask. The horizontal position "X" of slot 92a is adjustable by a translational device such as a stepper motor 94 in response to a gate control signal 94a. Similarly, the vertical position "Y" of slot 92b is adjustable and positioned by a translating device such as a electromechanical device or stepper motor 95 in accordance with a gate control signal 95a.

Figure 6:
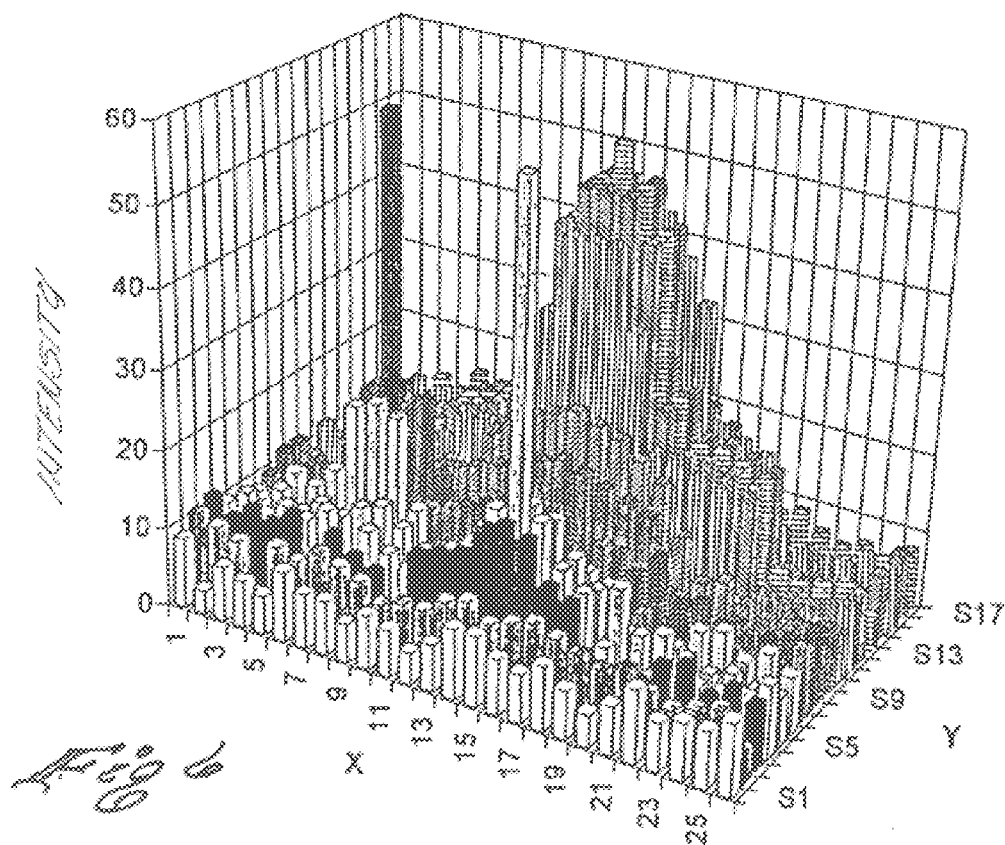
FIG. 6 illustrates the raw (unprocessed) pixel output signals recorded for each pixel xy on a photosensitive surface corresponding to the distribution and intensity of a particular spectral component within an image.
Figure 7:
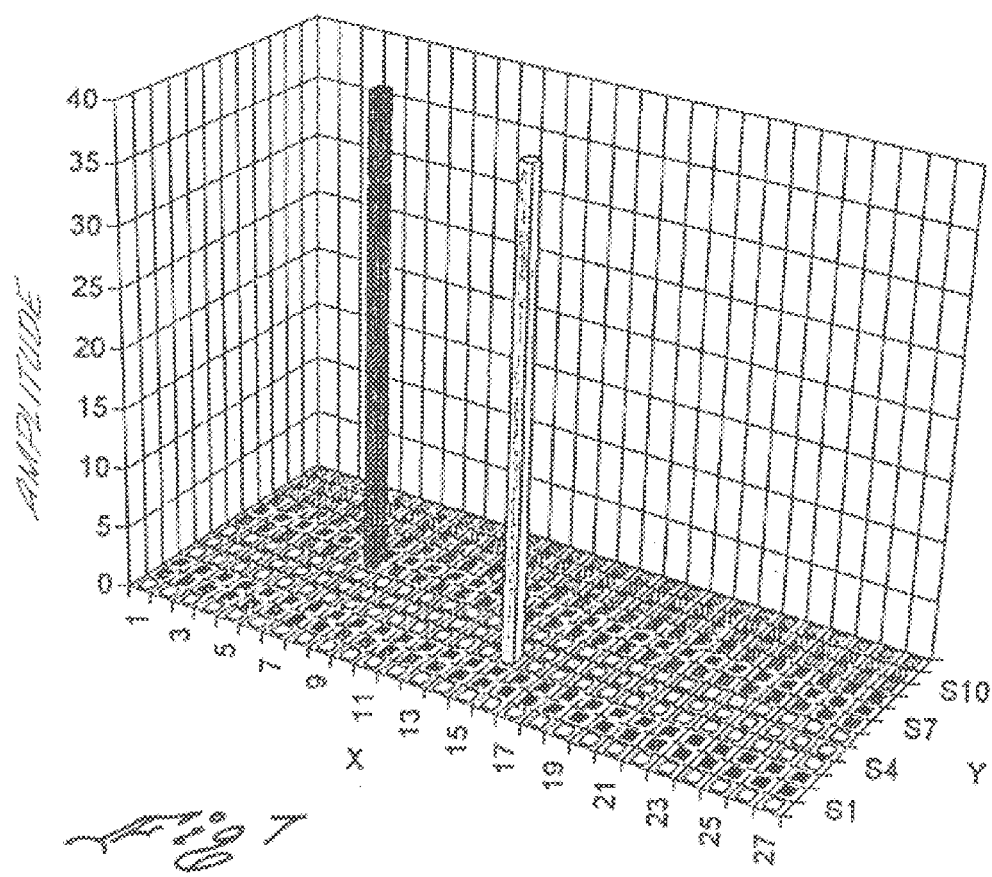
FIG. 7 illustrates the photodetector pixel output signals corresponding to FIG. 6 after the raw pixel signal output data is processed using the deconvolution algorithm employed by the signal processor.
Figure 10:
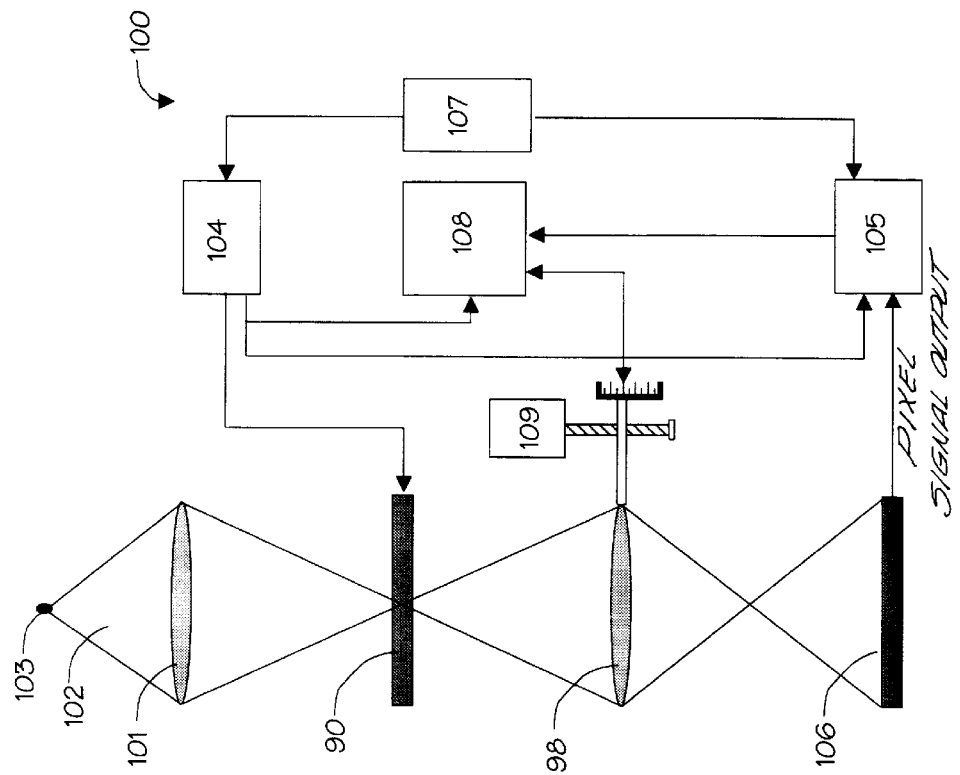
FIG. 10 is a schematic diagram of an embodiment of an IMSS device employing a transmissive mask in accordance with the present invention.

FIG. 10 is a schematic diagram of an IMSS apparatus 100 illustrating the functional relationship of a transmissive gated mask 90 operating in a manner similar to the hypothetical mask 90 shown in FIG. 9. A lens 101 focuses light 102 emanating from a source of light 103 within the field of view of the lens 101 upon the image receiving surface of the gated transmissive mask 90. The image of the field of view focused on the mask includes light emanating from all light sources, both discrete and continuous, within the field of view of the lens 101. A programmable control signal generator 104 initializes the location of the transmissive gate at a particular gate address and inputs the gate address to a multiplexer within the synchronous detector 105. The multiplexer samples the signal output of the pixel on the photodetector 106 positioned at the focal plane of the addressed initialized gate. A clock 107 triggers the multiplexer to sample a newly addressed pixel in synchrony with the change of gate address established by application of a new gate control signal to the mask. When all gates have been opened and the entire image receiving surface of the mask sampled, a signal processor 108 stores each pixel's signal output and the focal distance corresponding thereto and provides a stepping signal to a stepper motor 109 which, in response, incrementally changes the focal length by repositioning the diffractive lens 98 with respect to the photodetector plane. The signal processor 108 records and stores each pixel's output signal measured at different focal planes (diffractive lens—photodetector spacing), the data from one focal plate illustrated in FIG. 6. The signal processor 108 includes an algorithm which is used to eliminate the spectral bleed-through (noise) and retain the in-focused component of the image. The spatially filtered pixel signal output corresponding to the focal plane in FIG. 6 corresponding to the in-focus spectral component is illustrated in FIG. 7 which shows the field of view containing two discrete light sources emitting light at this wavelength. The sequence of signal outputs from each identified pixel corresponding to a particular light source is recorded as illustrated in FIG. 8 wherein lens position is proportional to focal length and therefore the wavelength of light incident upon the pixel. The relative intensity of the filtered spectral components for each light source appears as a variation in the corresponding pixel's output at each focal plane as shown in FIG. 8 and is presented to a spectral comparator 99 for further analysis or stored for future reference.

IMSS has reasonably good spectral purity when imaging point objects exhibiting a favorable contrast ratio with respect to the spectral composition of the background. By partitioning an image and sequentially sampling portions of the image for viewing using an addressable spatial mask, only a portion of the image is presented to the photodetector. The image is presented to the photodetector as a sequence of projected subimages similar to point objects, eliminating noise due to the blurred, out-of-focus spectral components from other independent sources of light comprising the image. Light associated with such other sources is blocked by the mask and are not detected by the addressed pixel. The incorporation of an addressable spatial mask in a IMSS, as described herein, provides an improvement in the spectral resolution attainable with IMSS devices when an image comprises independent light sources.

In view of the foregoing, and in light of the objectives of the invention, it will be apparent to those skilled in the art that the subject matter of this invention is capable of variation in its detail, and I do not therefore desire to be limited to the specific embodiment selected for purposes of explanation of the invention. For example, it is possible to employ a diffractive lens for the chromatic dispersion of light wherein the particular wavelength of light in focus at a particular point in space depends on the electromechanical forces applied to the lens as shown in FIG. 1. A diffractive optical element 110 can be made using polymer or spatial light modulators which change the characteristics of the lens such that the chromatic focal length of the lens can be adjusted by application of an appropriate electrical signal to the lens. In such a case there is no need to move the diffractive lens relative to either the spatial mask or the photodetector array to perform Image Multispectral Sensing. The foregoing has been merely a description of one embodiment of the imaging spectrophotometer. The scope of the invention can be determined by reference to the claims appended hereto.

What I claim is:

1. An apparatus for measuring the spectral composition of light emanating from a remote target comprising:

(a) an input optical element adapted to receive and transmit said light emanating from a remote target; and (b) a diffractive optical element having an optical axis and disposed to receive said light transmitted by said input optical element and adapted to disperse spectral components of said light into a volume having an area A and a length L; and (c) an addressable spatial mask disposed between said input optical element and said diffractive optical element comprising a sheet having a planar array of discrete addressable switchable apertures disposed thereon, said apertures being independently operable for directing a controllable portion of said light incident thereon to said diffractive optical element in response to a control signal; and (d) a photodetector array with pixels having an area substantially equal to the pixel footprint at the addressable mask, said photodetector array being disposed to receive dispersed light from said diffractive optical element; and (e) means for measuring said controllable portion of said light that is focused upon said photodetector array, said measured controllable portion comprising an image; and (f) means for changing the distance between said diffractive optical element and said photodetector array in the direction of L; and (g) means for controlling the direction of said light incident upon each of said plurality of apertures of said addressable spatial mask to impinge upon said diffractive optical element; and (h) means for measuring said distance between said diffractive optical element and said photodetector array; said spectral composition of light emanating from said remote target being determined by combining the images for each position along L.

2. The apparatus of claim 1, wherein said diffractive optical element is a diffractive lens.

3. The apparatus of claim 1, wherein said diffractive optical element is a diffractive mirror.

4. The apparatus of claim 1 wherein said diffractive optical element is a reflective mirror.

5. The apparatus of claim 1 wherein said diffractive optical element is a transmissive lens.

6. The apparatus of claim 1 wherein said addressable spatial mask comprises a plurality of discrete controllable optically reflective surfaces.

7. The apparatus of claim 1 wherein said addressable spatial mask comprises a plurality of discrete controllable optically transmissive surfaces.

8. The apparatus of claim 1 wherein said means for controlling the direction of said light incident upon each of said plurality of apertures of said addressable spatial mask is an electronic signal.

* * * * *